(12) United States Patent
Underdal et al.

(10) Patent No.: US 8,239,094 B2
(45) Date of Patent: Aug. 7, 2012

(54) TEST REQUIREMENT LIST FOR DIAGNOSTIC TESTS

(75) Inventors: Olav M. Underdal, Kalamazoo, MI (US); Harry M. Gilbert, Portage, MI (US); Oleksiy Portyanko, Kalamazoo, MI (US); Randy L. Mayes, Otsego, MI (US); Gregory J. Fountain, Kalamazoo, MI (US); William W. Wittliff, III, Gobles, MI (US)

(73) Assignee: SPX Corporation, Charlotte, NC (US)

( * ) Notice: Subject to any disclaimer, the term of this patent is extended or adjusted under 35 U.S.C. 154(b) by 901 days.

(21) Appl. No.: 12/108,126

(22) Filed: Apr. 23, 2008

(65) Prior Publication Data

US 2009/0271239 A1 Oct. 29, 2009

(51) Int. Cl.
*G01M 17/00* (2006.01)
*G06F 19/00* (2006.01)

(52) U.S. Cl. ............................................ 701/33; 701/35
(58) Field of Classification Search .................. None
See application file for complete search history.

(56) References Cited

U.S. PATENT DOCUMENTS

| | | |
|---|---|---|
| 4,757,463 A | 7/1988 | Ballou et al. |
| 4,796,206 A | 1/1989 | Boscove et al. |
| 4,817,092 A | 3/1989 | Denny |
| 4,866,635 A | 9/1989 | Kahn et al. |
| 4,873,687 A | 10/1989 | Breu |
| 4,881,230 A | 11/1989 | Clark et al. |
| 4,943,919 A | 7/1990 | Aslin et al. |
| 4,954,964 A | 9/1990 | Singh |
| 4,964,125 A | 10/1990 | Kim |
| 4,985,857 A | 1/1991 | Bajpai et al. |
| 5,010,487 A | 4/1991 | Stonehocker |
| 5,023,791 A | 6/1991 | Herzberg et al. |
| 5,025,392 A | 6/1991 | Singh |
| 5,036,479 A | 7/1991 | Prednis et al. |
| 5,099,436 A | 3/1992 | McCown et al. |
| 5,109,380 A | 4/1992 | Ogino |
| 5,111,402 A | 5/1992 | Brooks et al. |
| 5,127,005 A | 6/1992 | Oda et al. |
| 5,161,158 A | 11/1992 | Chakravarty et al. |
| 5,184,312 A | 2/1993 | Ellis |
| 5,214,577 A | 5/1993 | Sztipanovits et al. |
| 5,270,920 A | 12/1993 | Pearse et al. |
| 5,293,323 A | 3/1994 | Doskocil et al. |
| 5,396,422 A | 3/1995 | Forchert et al. |
| 5,442,549 A | 8/1995 | Larson |

(Continued)

FOREIGN PATENT DOCUMENTS

DE 10332203 A1 2/2005

(Continued)

OTHER PUBLICATIONS

European Search Report for Appl. No. 07252442.4, dated Sep. 11, 2007.

(Continued)

*Primary Examiner* — Michael J. Zanelli
(74) *Attorney, Agent, or Firm* — Baker & Hostetler LLP (57) ABSTRACT

A diagnostic system for a vehicle, including a memory receiving and storing vehicle specific information, and storing diagnostic test requirements of a plurality of diagnostic sequences, and a processor identifying the test requirements for a selected diagnostic sequence according to the vehicle specific information in advance of executing the diagnostic sequence.

24 Claims, 6 Drawing Sheets

U.S. PATENT DOCUMENTS

| | | | |
|---|---|---|---|
| 5,491,631 A | 2/1996 | Shirane et al. | |
| 5,524,078 A | 6/1996 | Kolb et al. | |
| 5,541,840 A | 7/1996 | Gurne et al. | |
| 5,561,762 A | 10/1996 | Smith et al. | |
| 5,572,424 A | 11/1996 | Kellogg et al. | |
| 5,586,252 A | 12/1996 | Barnard et al. | |
| 5,617,039 A | 4/1997 | Kuck et al. | |
| 5,631,831 A | 5/1997 | Bird et al. | |
| 5,670,939 A | 9/1997 | Rodewald et al. | |
| 5,671,141 A | 9/1997 | Smith et al. | |
| 5,696,676 A | 12/1997 | Takaba | |
| 5,729,452 A | 3/1998 | Smith et al. | |
| 5,742,500 A | 4/1998 | Irvin | |
| 5,778,381 A | 7/1998 | Sandifer | |
| 5,835,871 A | 11/1998 | Smith et al. | |
| 5,838,261 A | 11/1998 | Lauta et al. | |
| 5,852,789 A | 12/1998 | Trsar et al. | |
| 5,883,586 A | 3/1999 | Tran et al. | |
| 5,916,286 A | 6/1999 | Seashore et al. | |
| 5,964,811 A | 10/1999 | Ishii et al. | |
| 5,964,813 A | 10/1999 | Ishii et al. | |
| 5,987,443 A | 11/1999 | Nichols et al. | |
| 6,003,021 A | 12/1999 | Zadik et al. | |
| 6,003,808 A | 12/1999 | Nguyen et al. | |
| 6,006,146 A | 12/1999 | Usui et al. | |
| 6,012,152 A | 1/2000 | Douik et al. | |
| 6,032,088 A | 2/2000 | Feldmann et al. | |
| 6,041,287 A | 3/2000 | Dister et al. | |
| 6,055,468 A | 4/2000 | Kaman et al. | |
| 6,064,998 A | 5/2000 | Zabloudil et al. | |
| 6,067,537 A | 5/2000 | O'Connor et al. | |
| 6,067,538 A | 5/2000 | Zorba et al. | |
| 6,073,127 A | 6/2000 | Lannert et al. | |
| 6,085,184 A | 7/2000 | Bertrand et al. | |
| 6,119,074 A | 9/2000 | Sarangapani | |
| 6,122,575 A | 9/2000 | Schmidt et al. | |
| 6,134,488 A | 10/2000 | Sasaki et al. | |
| 6,141,608 A | 10/2000 | Rother | |
| 6,167,352 A | 12/2000 | Kanevsky et al. | |
| 6,175,787 B1 | 1/2001 | Breed | |
| 6,192,302 B1 | 2/2001 | Giles et al. | |
| 6,205,465 B1 | 3/2001 | Schoening et al. | |
| 6,226,627 B1 | 5/2001 | Polak | |
| 6,236,917 B1 | 5/2001 | Liebl et al. | |
| 6,249,755 B1 | 6/2001 | Yemini et al. | |
| 6,263,332 B1 | 7/2001 | Nasr et al. | |
| 6,282,469 B1 | 8/2001 | Rogers et al. | |
| 6,301,531 B1 | 10/2001 | Pierro et al. | |
| 6,314,375 B1 | 11/2001 | Sasaki et al. | |
| 6,330,499 B1 | 12/2001 | Chou et al. | |
| 6,338,148 B1 | 1/2002 | Gillenwater et al. | |
| 6,363,304 B1 | 3/2002 | Ramsey | |
| 6,370,455 B1 | 4/2002 | Larson et al. | |
| 6,477,453 B2 | 11/2002 | Oi et al. | |
| 6,493,615 B1 | 12/2002 | Johnston | |
| 6,505,106 B1 | 1/2003 | Lawrence et al. | |
| 6,512,968 B1 | 1/2003 | de Bellefeuille et al. | |
| 6,522,987 B1 | 2/2003 | Flink et al. | |
| 6,526,361 B1 | 2/2003 | Jones et al. | |
| 6,538,472 B1 | 3/2003 | McGee | |
| 6,557,115 B2 | 4/2003 | Gillenwater et al. | |
| 6,560,516 B1 | 5/2003 | Baird et al. | |
| 6,574,537 B2 | 6/2003 | Kipersztok et al. | |
| 6,591,182 B1 | 7/2003 | Cece et al. | |
| 6,609,051 B2 | 8/2003 | Fiechter et al. | |
| 6,611,740 B2 | 8/2003 | Lowrey et al. | |
| 6,615,120 B1 | 9/2003 | Rother | |
| 6,636,790 B1 | 10/2003 | Lightner et al. | |
| 6,640,166 B2 | 10/2003 | Liebl et al. | |
| 6,643,607 B1 | 11/2003 | Chamberlain et al. | |
| 6,662,087 B1 | 12/2003 | Liebl et al. | |
| 6,694,235 B2 | 2/2004 | Akiyama | |
| 6,708,092 B1 | 3/2004 | Starks et al. | |
| 6,711,134 B1 | 3/2004 | Wichelman et al. | |
| 6,714,846 B2 * | 3/2004 | Trsar et al. ............... 701/33 | |
| 6,738,697 B2 | 5/2004 | Breed | |
| 6,751,536 B1 | 6/2004 | Kipersztok et al. | |
| 6,768,935 B1 | 7/2004 | Morgan et al. | |
| 6,795,778 B2 | 9/2004 | Dodge et al. | |
| 6,807,469 B2 | 10/2004 | Funkhouser et al. | |
| 6,819,988 B2 | 11/2004 | Dietz et al. | |
| 6,836,708 B2 | 12/2004 | Tripathi | |
| 6,845,307 B2 | 1/2005 | Rother | |
| 6,868,319 B2 | 3/2005 | Kipersztok et al. | |
| 6,874,680 B1 | 4/2005 | Klaus et al. | |
| 6,928,349 B1 | 8/2005 | Namaky et al. | |
| 6,950,829 B2 * | 9/2005 | Schlabach et al. ............... 1/1 | |
| 7,010,460 B2 | 3/2006 | Trsar et al. | |
| 7,013,411 B2 | 3/2006 | Kallela et al. | |
| 7,050,894 B2 | 5/2006 | Halm et al. | |
| 7,062,622 B2 | 6/2006 | Peinado | |
| 7,073,120 B2 | 7/2006 | Torii et al. | |
| 7,082,359 B2 | 7/2006 | Breed | |
| 7,103,610 B2 | 9/2006 | Johnson et al. | |
| 7,103,679 B2 | 9/2006 | Bonn | |
| 7,120,890 B2 | 10/2006 | Urata et al. | |
| 7,124,058 B2 | 10/2006 | Namaky et al. | |
| 7,142,960 B2 | 11/2006 | Grier et al. | |
| 7,162,741 B2 | 1/2007 | Eskin et al. | |
| 7,165,216 B2 | 1/2007 | Chidlovskii et al. | |
| 7,171,372 B2 * | 1/2007 | Daniel et al. ............... 705/7.13 | |
| 7,209,815 B2 | 4/2007 | Grier et al. | |
| 7,209,860 B2 | 4/2007 | Trsar et al. | |
| 7,216,052 B2 | 5/2007 | Fountain et al. | |
| 7,251,535 B2 | 7/2007 | Farchmin et al. | |
| 7,272,475 B2 | 9/2007 | Gawlik et al. | |
| 7,272,756 B2 | 9/2007 | Brink et al. | |
| 7,286,047 B2 | 10/2007 | Oesterling et al. | |
| 7,373,225 B1 | 5/2008 | Grier et al. | |
| 7,376,497 B2 * | 5/2008 | Chen ............... 701/29 | |
| 7,379,846 B1 | 5/2008 | Williams et al. | |
| 7,400,954 B2 | 7/2008 | Sumcad et al. | |
| 7,409,317 B2 | 8/2008 | Cousin et al. | |
| 7,428,663 B2 | 9/2008 | Morton et al. | |
| 7,430,535 B2 | 9/2008 | Dougherty et al. | |
| 7,444,216 B2 | 10/2008 | Rogers et al. | |
| 7,483,774 B2 | 1/2009 | Grichnik et al. | |
| 7,543,916 B2 | 6/2009 | Silverbrook | |
| 7,555,376 B2 | 6/2009 | Beronja | |
| 7,565,333 B2 | 7/2009 | Grichnik et al. | |
| 7,610,127 B2 | 10/2009 | D'Silva et al. | |
| 7,636,622 B2 | 12/2009 | Underdal et al. | |
| 7,643,912 B2 | 1/2010 | Heffington | |
| 7,647,349 B2 | 1/2010 | Hubert et al. | |
| 7,715,961 B1 | 5/2010 | Kargupta | |
| 7,739,007 B2 | 6/2010 | Logsdon | |
| 7,751,955 B2 | 7/2010 | Chinnadurai et al. | |
| 7,752,224 B2 | 7/2010 | Davis et al. | |
| 7,761,591 B2 | 7/2010 | Graham | |
| 7,778,746 B2 | 8/2010 | McLeod et al. | |
| 7,788,096 B2 | 8/2010 | Chelba et al. | |
| 7,809,482 B2 | 10/2010 | Bertosa et al. | |
| 7,853,435 B2 | 12/2010 | Dodge et al. | |
| 7,860,620 B2 | 12/2010 | Kojitani et al. | |
| 7,865,278 B2 | 1/2011 | Underdal et al. | |
| 7,925,397 B2 | 4/2011 | Underdal et al. | |
| 8,019,501 B2 | 9/2011 | Breed | |
| 8,055,907 B2 | 11/2011 | Deem et al. | |
| 2002/0007237 A1 | 1/2002 | Phung et al. | |
| 2002/0059075 A1 | 5/2002 | Schick et al. | |
| 2002/0091736 A1 | 7/2002 | Wall | |
| 2002/0112072 A1 | 8/2002 | Jain | |
| 2002/0116669 A1 | 8/2002 | Jain | |
| 2002/0173885 A1 | 11/2002 | Lowrey et al. | |
| 2003/0177414 A1 | 9/2003 | Pillutla et al. | |
| 2004/0001106 A1 | 1/2004 | Deutscher et al. | |
| 2004/0034456 A1 * | 2/2004 | Felke et al. ............... 701/29 | |
| 2004/0039493 A1 | 2/2004 | Kaufman | |
| 2004/0181688 A1 | 9/2004 | Wittkotter | |
| 2005/0043868 A1 | 2/2005 | Mitcham | |
| 2005/0065678 A1 | 3/2005 | Smith et al. | |
| 2005/0071143 A1 | 3/2005 | Tran et al. | |
| 2005/0137762 A1 | 6/2005 | Rother | |
| 2005/0171661 A1 * | 8/2005 | Abdel-Malek et al. ......... 701/33 | |
| 2005/0177352 A1 | 8/2005 | Gravel | |
| 2005/0222718 A1 | 10/2005 | Lazarz et al. | |
| 2006/0030981 A1 | 2/2006 | Robb et al. | |

| | | |
|---|---|---|
| 2006/0074824 A1 | 4/2006 | Li |
| 2006/0095230 A1 | 5/2006 | Grier et al. |
| 2006/0129906 A1 | 6/2006 | Wall |
| 2006/0136104 A1 | 6/2006 | Brozovich et al. |
| 2006/0142907 A1 | 6/2006 | Cancilla et al. |
| 2006/0142910 A1* | 6/2006 | Grier et al. ............... 701/29 |
| 2006/0149434 A1 | 7/2006 | Bertosa et al. |
| 2006/0229777 A1 | 10/2006 | Hudson et al. |
| 2007/0100520 A1 | 5/2007 | Shah et al. |
| 2007/0124282 A1 | 5/2007 | Wittkotter |
| 2007/0226540 A1 | 9/2007 | Konieczny |
| 2007/0250228 A1 | 10/2007 | Reddy et al. |
| 2007/0293998 A1 | 12/2007 | Underdal et al. |
| 2007/0294001 A1 | 12/2007 | Underdal et al. |

FOREIGN PATENT DOCUMENTS

| | | |
|---|---|---|
| EP | 1674958 A1 | 6/2006 |
| GB | 2329943 A | 4/1999 |
| JP | 06-265596 A1 | 9/1994 |

OTHER PUBLICATIONS

European Search Report for Appl. No. 07252441, dated Jun. 20, 2008.
L.J. Aartman, et al., "An Independent Verification Tool for Multi-Vendor Mode S Airborne Transponder Conformance Testing," 21st Digital Avionics Systems Conference, 2002, pp. 12.E.5-1-12.E.5-11, vol. 2.
"Annex A Test Bit Sequence," Methodology for Jitter and Signal Quality; Specification—MJSQ Technical Report REV 10.0, pp. 117-132, Mar. 10, 2003.
Tariq Assaf, et al. "Automatic Generation of Diagnostic Expert Systems from Fault Trees," 2003 Proceedings Annual Reliability & Maintainability Symposium, pp. 143-147.
R. Belhassine-Cherif, et al., "Multiple Fault Diagnostics for Communicating Nondeterministic Finite State Machines," 6th IEEE Symposium on Computers and Communications, Jul. 3-5, 2001, pp. 661-666.
M. Ben-Bassat, et al., "A1-Test: A Real Life Expert System for Electronic Troubleshooting (A Description and a Case Study)," 4th Conference on Artificial Intelligence Applications, 1988, pp. 2-10.
F. Brajou, et al., "The Airbus A380—An AFDX-Based Flight Test Computer Concept," 2004 IEEE AUTOTESTCON, pp. 460-463.
Cantone, et al., "IN-ATE: Fault Diagnosis as Expert System Guided Search," Computer Expert Systems, L. Bolc & M.J. Coombs (eds.), Springer-Verlag, New York 1986, pp. 298-348.
"Computerized Diagnostic Tester at Hand," Electrical World, Aug. 1, 1975, pp. 36-38.
T.A. Cross, "A Digital Electronic System for Automobile Testing and Diagnosis," IEE Conference Jul. 6-9, 1976, London, England, pp. 152-159.
eHow Contributor, "How to Organize Computer Files," printed Mar. 31, 2011 from http://www.ehow.com/print/how_138482_organize-computer-files.html.
F. Esposito, et al., "Machine Learning Methods for Automatically Processing Historical Documents: from Paper Acquisition to XML Transformation," 1st Int'l Workshop on Document Image Analysis for Libraries, Jan. 23-24, 2004, pp. 328-335.
H. Garcia-Molina, et al., "dSCAM: Finding Document Copies Across Multiple Databases," 4th Int'l Conference on Parallel and Distributed Information Systems, Dec. 18-20, 1996, pp. 68-79.
I. Ghosh, et al., "Automatic Test Pattern Generation for Functional Register-Transfer Level Circuits Using Assignment Decision Diagrams," IEEE Transactions on Computer-Aided Design of Integrated Circuits and Systems, vol. 20, Issue 3, Mar. 2001, pp. 402-415.

M. Koppel, et al., "Automatically Classifying Documents by Ideological and Organizational Affiliation," IEEE Int'l Conference on Intelligence and Security Informatics, Jun. 8-11, 2009, pp. 176-178.
J.C. Lin, et al., "Using Genetic Algorithms for Test Case Generation in Path Testing," 9th Asian Test Symposium, Dec. 4-6, 2000, pp. 241-246.
W. Linzhang, et al., "Generating Test Cases from UML Activity Diagram Based on Gray-Box Method," 11th Asia-Pacific Software Engineering Conference, Nov. 30-Dec. 3, 2004, pp. 1-8.
B.D. Liu, et al., "Efficient Global Strategy for Designing and Testing Scanned Sequential Circuits," IEE Proceedings on Computers and Digital Techniques, vol. 142, No. 2, Mar. 1995, pp. 170-176.
M. Mayer, "The Computerized Diagnostic Rhyme Test as a Design Tool for Armored Vehicle Intercommunications Systems," Military Communications Conference, 1985, pp. 166-170.
Microsoft at Work, "File Organization tips: 9 ideas for managing files and folders," printed Mar. 30, 2011 from http://www.microsoft.com/atwork/productivity/files.aspx.
S.M. Namburu, et al., "Systematic Data-Driven Approach to Real-Time Fault Detection and Diagnosis in Automotive Engines," 2006 IEEE Autotestcon, pp. 59-65.
"Names files and folders—How To—Web Team—University of Canterbury, New Zealand," printed on Mar. 31, 2011 from http://www.canterbury.ac.nz/web/how/filename.shtml.
D. Niggemeyer, et al., "Automatic Generation of Diagnostic March Tests," 19th IEEE Proceedings on VLSI Test Symposium, 2001, pp. 299-304.
Yiannis Papadopoulos, et al., "Automating the Failure Modes and Effects Analysis of Safety Critical Systems," Proceedings of the Eighth IEEE Int'l Symposium on High Assurance Systems Engineering (HASE '04), 2004.
F.C. Pembe, et al., "Heading-Based Sectional Hierarchy Identification for HTML Documents," 22nd Int'l Symposium on Computer and Information Sciences, Nov. 7-9, 2007, pp. 1-6.
F. Pipitone, "The FIS Electronics Troubleshooting System Guided Search," Computer Expert Systems, vol. 19, No. 7, 1986, pp. 68-76.
G. Qin, et al., "On-Board Fault Diagnosis of Automated Manual Transmission Control System," IEEE Transactions on Control Systems Technology, vol. 12, No. 4, Jul. 2004, pp. 564-568.
H.M.T. Saarikoski, "2T: Two-Term Indexing of Documents Using Syntactic and Semantic Constraints," 16th Int'l Workshop on Database and Expert Systems Applications, Aug. 22-26, 2005, pp. 1025-1028.
P. Samuel, et al., "UML Sequencing Diagram Based Testing Using Slicing," An Int'l Conference of IEEE India Council, Dec. 11-13, 2005, pp. 176-178.
F.Y. Shih, et al., "A Document Segmentation, Classification and Recognition System," 2nd Int'l Conference on Systems Integration, 1992, pp. 258-267.
H. Trier, "Further Development of the Periodical Vehicle Test by Using Diagnostic Interface," IEE Colloquium on Vehicle Diagnostics in Europe, 1994, pp. 4/1-4/2.
J. van Beers, et al., "Test Features of a Core-Based Co-Processor Array for Video Applications," Int'l Test Conference, 1999, pp. 638-647.
J.R. Wagner, "Failure Mode Testing Tool Set for Automotive Electronic Controllers," IEEE Transactions on Vehicular Technology, vol. 43, Issue 1, Feb. 1994, pp. 156-163.
Reuben Wright, et al., "How Can Ontologies Help Repair Your Car?" XTECH 2005: XML, the Web and beyond; May 27, 2005, Amsterdam; http://ww.idealliance.org/proceedings/xtech05/papers/02-07-02/.

* cited by examiner

TEST REQUIREMENT LIST FOR DIAGNOSTIC TESTS

TECHNICAL FIELD

The present disclosure relates generally to diagnostic equipment and method thereof. More particularly, the present disclosure relates to diagnostic test requirement list for diagnostic equipment and method thereof.

BACKGROUND OF THE DISCLOSURE

Onboard control computers have become prevalent in motor vehicles, but as safety, economy, and emissions requirements have continued to tighten, vehicle systems and devices have not met the requirements set out in government regulations and the implicit demands of competitors' achievements. Successive generations of onboard control computers have acquired increasing data sensing and retention capability as the electronics have advanced.

Present external diagnostic and display apparatus, known as diagnostic tools, are commonly limited to reporting the data acquired by the onboard control computer itself. Increasingly, subtle subsystem failures in vehicles overload the ability of maintenance technicians, not simply to read the faults detected and stored by the diagnostic tools themselves, but to combine those readings with peripheral measurements and deduce corrective actions with both speed and accuracy.

Currently in the automotive industry, there are both stand alone and hand-held diagnostic testers or tools used in connection with motor vehicle maintenance and repair. For example, hand-held diagnostic tools have been used to trouble-shoot faults associated with vehicular control units. Diagnostic tools can detect faults based on Diagnostic Trouble Codes or DTCs that are set in the vehicle's onboard control computer. A DTC can be triggered and stored when there is a problem with the vehicle. A technician then retrieves the DTC using a diagnostic tool, repairs the associated problem and then deletes the DTC from the vehicle's computer.

Including and beyond diagnostic trouble codes, in general, diagnostic systems are used by technicians and professionals in virtually all industries to perform basic and advanced system testing functions. For example, in the automotive, trucking, heavy equipment and aircraft industries, diagnostic test systems provide for vehicle onboard computer fault or trouble code display as mentioned above, interactive diagnostics, multiscope and multimeter functions, and electronic service manuals. In the medical industry, diagnostic systems provide for monitoring body functions and diagnosis of medical conditions, as well as system diagnostics to detect anomalies in the medical equipment.

In many industries, diagnostic systems play an increasingly important role in manufacturing processes, as well as in maintenance and repair throughout the lifetime of the equipment or product. Some diagnostic systems are based on personal computer technology and feature user-friendly, menu-driven diagnostic applications. These systems assist technicians and professionals at all levels in performing system diagnostics on a real-time basis.

A typical diagnostic system includes a display on which instructions for diagnostic procedures are displayed. The system also includes a system interface that allows the operator to view real-time operational feedback and diagnostic information. Thus, the operator may view, for example, vehicle engine speed in revolutions per minute, or battery voltage during start cranking; or a patient's heartbeat rate or blood pressure. With such a system, a relatively inexperienced operator may perform advanced diagnostic procedures and diagnose complex operational or medical problems.

The diagnostic procedures for diagnostic systems of this sort are typically developed by experienced technical experts or professionals. The technical expert or professional provides the technical experience and knowledge required to develop complex diagnostic procedures. Thus, the efficacy of the diagnostic procedures, in particular the sequence in which the diagnostic procedures are performed, is highly dependent on the expertise of the technical expert or professional authoring the procedures.

When diagnostic tests are performed, a user must have certain tools to perform the test. However, it is difficult with current diagnostic systems to be properly prepared for such diagnostic tests. Usually if a user is mobile, the user may have to go back to his or her automobile to get additional tools to perform the test or repair. Further, it is difficult to check whether the user can actually perform the test and in an efficient manner. Therefore, the judgment is left to each individual user and their expertise. It is difficult to obtain consistency in the diagnostics and repair from one technician to another. There is a need to have a technique and system that will accommodate for a greater efficiency that is not dependent upon the technician performing the diagnostics and repairs. Further, there is a need to properly organize resources needed ahead of time to perform certain tests and diagnostic methods.

SUMMARY OF THE DISCLOSURE

The foregoing needs are met, to a great extent, by the present disclosure, wherein one aspect a technique and apparatus are provided that will allow a technician to use a diagnostic system that provides a list of requirements to support a diagnostic test in advance of the test being performed, thus allowing for a greater efficiency and consistency of the diagnostics.

In an aspect of the present disclosure, a diagnostic system for a vehicle, includes a memory, receiving and storing vehicle specific information, and storing diagnostic test requirements of a plurality of diagnostic sequences from a remote database, and a processor identifying the test requirements for a selected diagnostic sequence according to the vehicle specific information in advance of executing the diagnostic sequence. The diagnostic system can also include the processor permitting a repair facility to schedule certain testing and repairs based on the availability of the test requirements. The diagnostic system can also include a repair facility to allocate the inventory and environment for the diagnostic tests in advance of diagnostic tests and repairs.

The diagnostic system, can also include a display device connected to the processor to display the test requirements for certification of the levels aptitude with regard to the diagnostic tests. The diagnostic system can also include the test requirements being associated with a diagnostic or repair step in a diagnostic tool sequence during authoring of that step. The diagnostic system can also include the test requirements including tools, parts, facilities and training. The diagnostic system can also include the characterization of the test requirements including the cost of the requirement. The diagnostic system can further include a display device, with the diagnostic requirements including the display on the display device, a list of items that are required to perform a given diagnostic or repair procedure, the diagnostic requirements being generated for any set of diagnostic sequences.

In another aspect of the present disclosure, a method for vehicle diagnostics includes storing a sequence of test or repair procedures in a database, correlating the sequence of test or repair procedure with a list of test requirements for each sequential step, receiving vehicle specific information, identifying a list of test requirements according to the vehicle specific information and the correlated sequence of test or repair procedures, and performing a diagnostic test or repair on the vehicle according to the vehicle specific information and the identified list of test requirements.

In yet another aspect of the disclosure, the vehicle diagnostics system, includes a means for storing a sequence of test or repair procedures in a database, a means for correlating the sequence of test or repair procedures with a list of test requirements for each sequential step, a means for receiving vehicle specific information, a means for identifying a list of test requirements according to the vehicle specific information and the correlated sequence of test or repair procedures, and a means for performing a diagnostic test or repair on the vehicle according to the vehicle specific information and the identified list of test requirements.

There has thus been outlined, rather broadly, certain embodiments of the disclosure in order that the detailed description thereof herein may be better understood, and in order that the present contribution to the art may be better appreciated. There are, of course, additional embodiments of the disclosure that will be described below and which will form the subject matter of the claims appended hereto.

In this respect, before explaining at least one embodiment of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

DETAILED DESCRIPTION

The disclosure will now be described with reference to the drawing figures, in which like reference numerals refer to like parts throughout. An embodiment in accordance with the present disclosure provides an apparatus and method that will allow a user, such as a technician, to use a computer or diagnostic equipment to generate a list of resources needed to complete a diagnostic test procedure or a repair.

For each step in a diagnostic sequence, certain test requirements, e.g., tools, parts, facilities, training, etc., required to complete that step can be identified. Having the test requirements can permit advanced planning for a diagnostic step and/or the entire diagnostic sequence. Taken further, this information can permit a repair facility to schedule certain testing and repairs based on availability of test requirements. Additionally, this information can permit a repair facility to plan its inventory and environment regarding these test requirements in advance to be able to support said diagnostic tests and repairs.

Moreover, this information can facilitate training in the use of these test requirements to certify levels of competence in certain tests and repairs. The availability of these test requirements can result in a given facility being certified to perform certain diagnostic tests and repairs.

Figure 1:
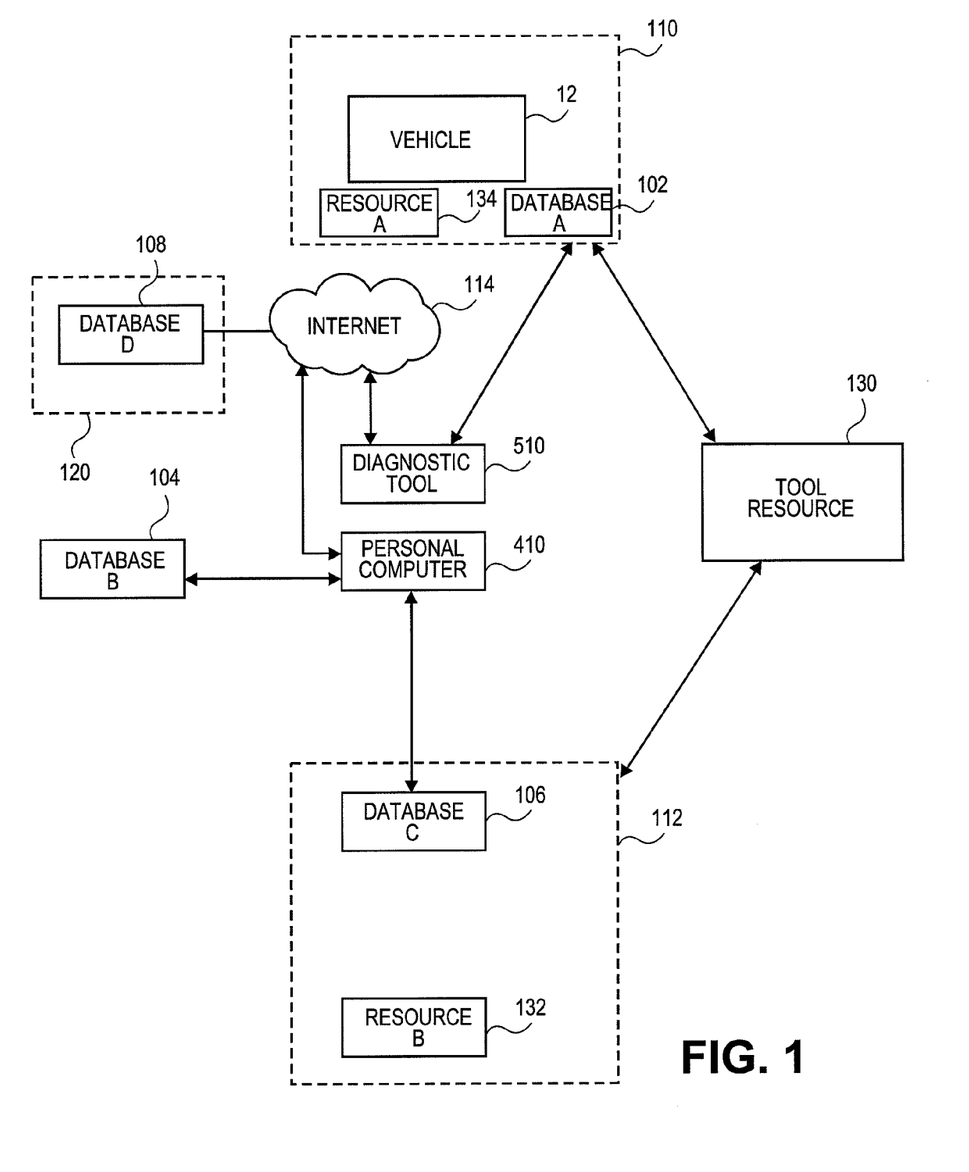
FIG. 1 is a diagram of the system producing a list of requirements.

Referring to FIG. 1, a database 102 (database A) of test requirements will be maintained at a repair facility 110. The database is not limited to being located at the repair facility 110, as it can be at any location where the diagnostic tests are performed, or the database can be remotely located at the manufacturer's facility or third party vendor facility 112 as seen in database C 106. The database with the test requirements can also be on an independent server 120 on the Internet 114, as seen for example on database D 108. As seen in database B 104, the database with test requirements can be on a memory unit remote from the repair facility 110, or manufacturing facility 112, and the database B 104 is not connected directly to the Internet 114 or other network.

The test requirements can then be optionally associated with a diagnostic or repair step in the advanced diagnostic function diagnostic sequence during the authoring of that step. The information from any of the databases holding the pertinent information (102-108) can be the transmitted or uploaded into the diagnostic tool 510 or the personal computer 800.

Alternatively, the test requirement information can be pre-loaded into the memory of the diagnostic tool 510 or personal computer 800 before the authoring of the step and associated within the diagnostic tool 510 or computer 800. In addition, the information of the test requirements can be updated at anytime after authoring of the diagnostic sequence.

Characterization of test requirements can be extended to include the cost of establishing a requirement, or other related criteria or variable or constant related to the specific test requirement. In this manner, the test requirement becomes a component of the overall diagnostic cost, and is factored into the employed optimization algorithm.

For example, a test requirement of a screw driver can include the cost of ten United States dollars. Other extensions can be linked resources, such as a tool that requires an additional technician. Therefore, tool "X" will require an additional technician to get the diagnosis or repair completed. Additional extensions can be, for example, the level of expertise of the technician, or the availability of the technician or the tool in the tool box 130. The requirements list may be used to show that the hammer is not in tool resource 130, but in resource B 132 at the manufacturing facility 112. Therefore, the location of the resource can be added to the list. The factors of location or the availability of the resource can then be factored into the optimization algorithm employed in the diagnosis or repair of the vehicle 12.

Figure 2:
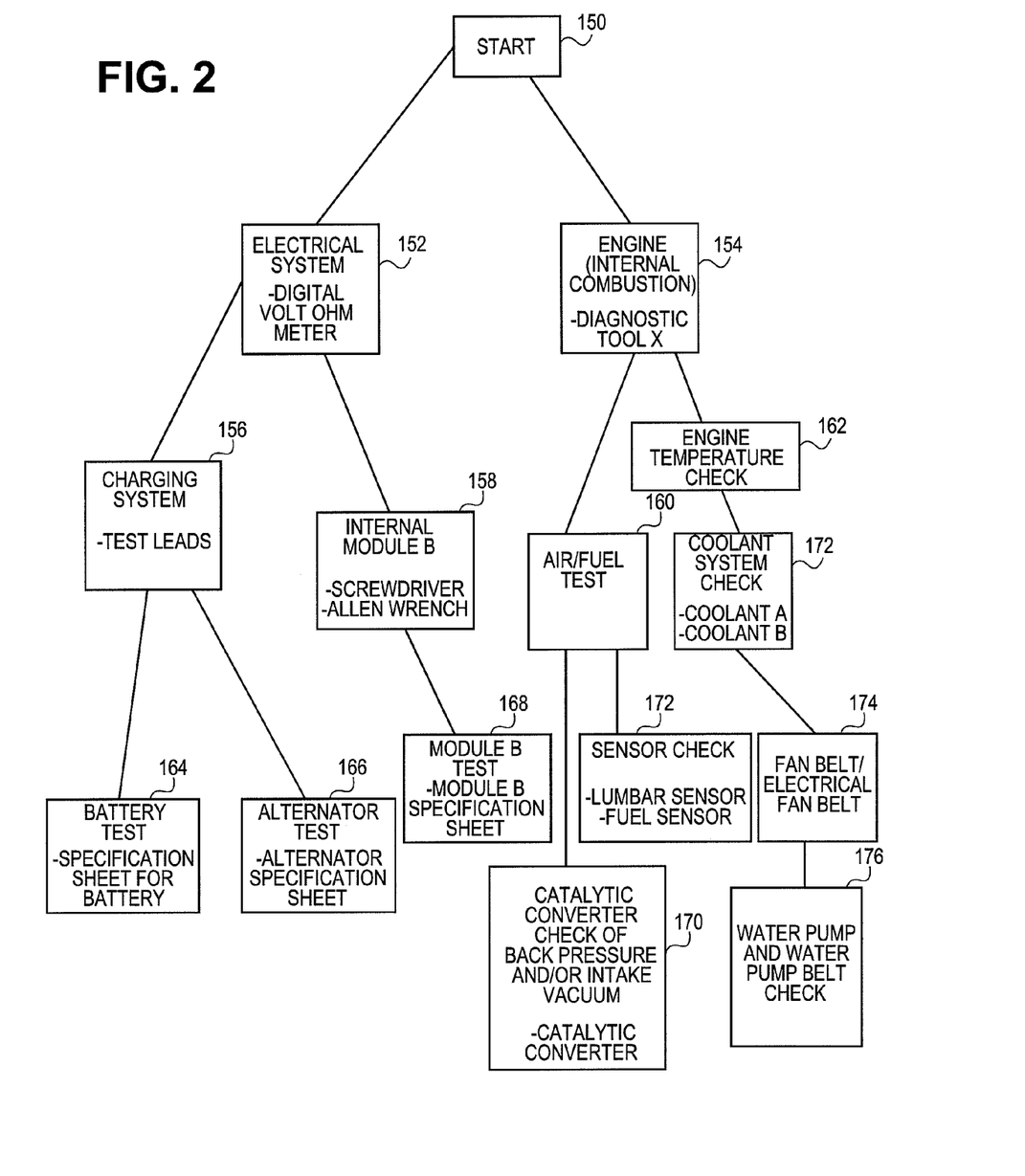
FIG. 2 is a flow diagram of the diagnostic tests producing a list of requirements.

Referring to FIG. 2, a diagnostic chart can be generated. Therefore, there would be a plurality of steps that would each generate a list of test requirements. A technician or user would use the diagnostic tool 510 or a personal computer 800 or other computing device, or even device embedded in the vehicle 12. The user would start the diagnostic tool 510, for example, and then choose for a list of options in a menu or manually type in the diagnostic steps needed at step 150. The vehicle specific information can be entered manually or automatically inputted from the vehicle 12 itself. Then, the user can select a diagnostic sequence or repair of the electrical system 152. The test requirements list would include a digital volt ohm meter that is necessary for the pre-programmed different types of sequences. The cost of the digital volt ohm meter can also be generated and displayed. Then, the user can select to test the charging system, which would give the requirement of test leads at step 156. Then, the user can select a battery test 164, which would give a specification sheet for the battery. The diagnostic tool 510 can indicate the sheet needed, or actually provide or include the sheet on the battery, or the location of the information. The user can also, instead choose to test the alternator 166, which would give the option of the alternator specification sheet. The information on the alternator can also be stored on the diagnostic tool itself, but if update is needed, the updated current information can be cited to its location.

The user can also select an internal module B 158 that is located in a position in the vehicle that may require extra steps to get to. Therefore, the test requirements can show a screwdriver and the allen wrench. The list can also include the feature of "optional" or "required" in its extension of the resource list. Then in step 168, the module B specification sheet can be indicated or used.

Alternatively, the user can select to test or repair the engine. Then, the list on step 154 can indicate a test requirement of an additional diagnostic tool, such as diagnostic tool "X", that is needed in addition to the diagnostic tool 510 being used. The user can then select to do an air/fuel test 160, which leads to a check of the sensor 172 or the catalytic converter 170 depending on certain factors or entries into the diagnostic tool 510. If the sensor check is selected, then the list can produce the sensor that may need replacing, such as the lambda sensor or the fuel sensor. An option indicator can be included to have the resource at hand and its model number, if the sensor needs replacement. If the catalytic converter 170 is selected, then there can be a check of the backpressure or intake. The requirements list can generate a list of the catalytic converter and the model and type of converter that is needed. Additionally, there can be attached a statistical likelihood of needing the part depending on the test. For example, if it is known that a certain result has a 10 percent chance of needing a replacement of the catalytic converter when the backpressure is below a certain value. Alternatively, if the catalytic converter does not need replacement, a certain tool can be in the list to clear the passage leading to the catalytic converter.

The user can also select to check the engine temperature 162, and then the user can check the coolant system 172. The list then produces two types of coolant and lists when to use either coolant A or coolant B or under what conditions. Then, the fan belt or the electrical of the fan can be checked 174. Thereafter, the water pump and water pump belt can be checked 176. In both step 174 and 176, there can be a generation of the requirements needed, and additional conditions connected to the requirements, such as cost, location, etc., of the individual or group of requirements.

The user can select any level of the diagnostic sequence to see what is needed. For example, if the technician does not know what to check exactly or what exact sequence, but only knows of a certain symptom, then the symptom can entered and all the test requirements under all the steps can be generated. For example, if a symptom under the electrical system is chosen, then the digital volt-ohm meter, test leads, screw driver, alien wrench, the specification sheets for the battery, alternator and module B is generated.

Figure 3:
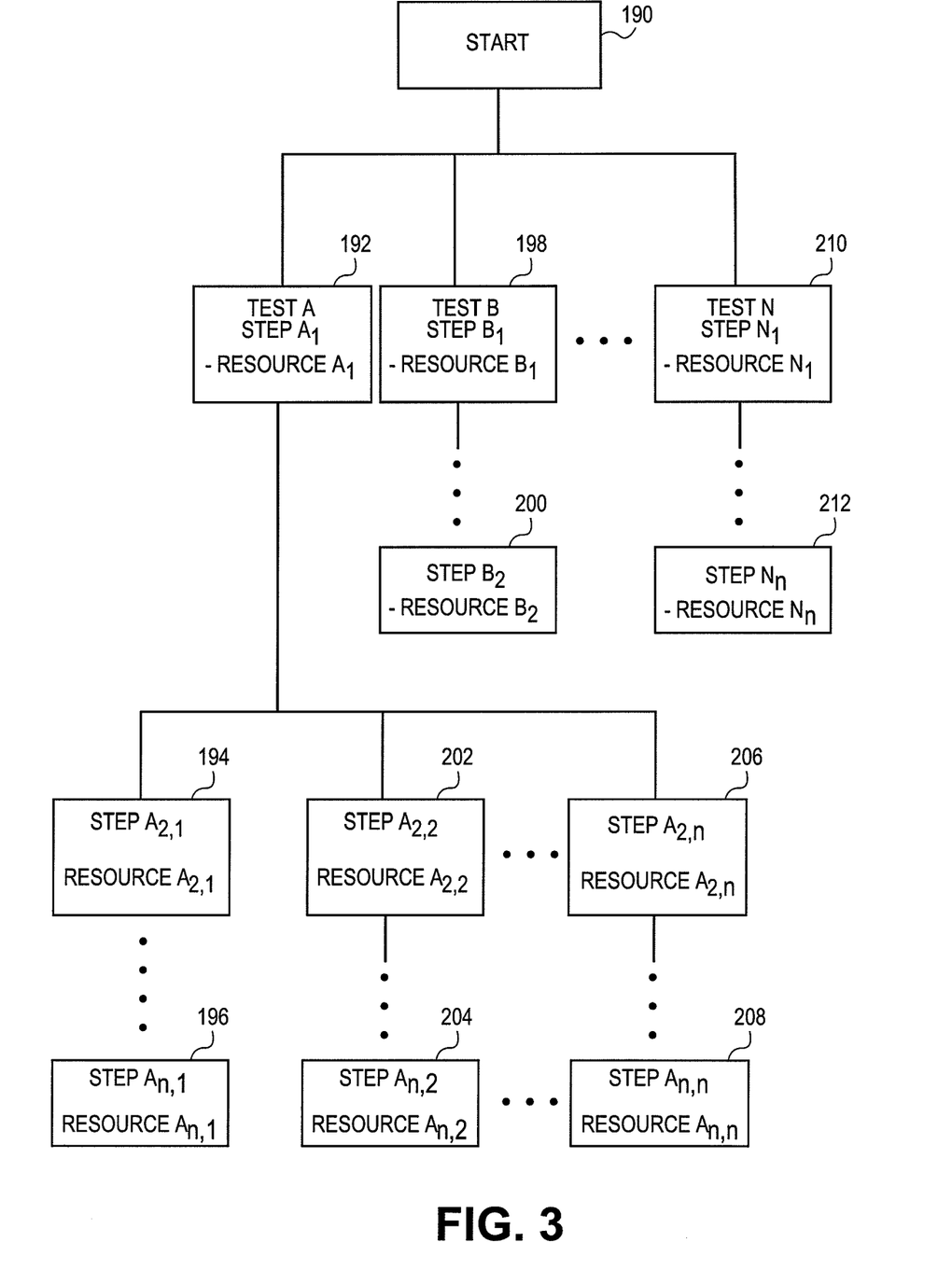
FIG. 3 is another flow diagram producing a list of necessary or optional resources for a repair or diagnostic tests.

Referring to FIG. 3, the test requirement resources can be generated for any type of diagnostic or repair sequence. The user starts 190 by selecting the symptom to be tested or the area of the vehicle to be tested. Therefore, the user can select test A 192, test B 198, all the way up to test N 210, where N is an integer greater than 2. Then, when step A is selected, a plurality of steps A1 to An 192-196 can be performed, with each step generating a resource requirement from A1 to An, where n is an integer greater than 2.

When test A is selected, the steps can also be alternatively step $A_{2,2}$ 202, all the way up to step $A_{2,n}$ 206. Step $A_{2,1}$ 194 can generate resource $A_{2,1}$, while step $A_{2,2}$ 202 generates resource $A_{2,2}$, and step $A_{2,n}$ can generate resource $A_{2,n}$ 206. The steps can be further expanded into steps $A_{n,1}$ with resource $A_{n,1}$ 196, step $A_{n,2}$ with resource $A_{n,2}$ 204 and step $A_{n,n}$ with resource $A_{n,n}$, where n is a number greater than 2. Furthermore, step $B_1$ with resource $B_1$ can be expanded to step $B_2$ with resource B2 200, and test N with step $N_1$ and resource $N_1$ 210 can be expanded to step $N_n$ and resource $N_n$ 212, where N and n are integers greater than 2. Therefore, as shown in FIG. 3, the possibilities of generating the requirements list are endless. There are pluralities of potential possibilities that can be generated from the list.

The user, as mentioned above, can select any level of the sequence to generate the list, or the level of generation can be pre-selected. For example, if the level at step 194 is limited, then resources $A_1$, $A_{2,1}$, up to $A_{n,1}$ will be generated. However, if the level at step 192 is selected, then resources $A_1$ to $A_{n,n}$ will be displayed or generated.

The output of the list is not limited to a display. The output can be displayed or it can be transmitted to another location for view by another user or device. The output of the list can also be transmitted or uploaded to a remote database.

Therefore, as shown in FIGS. 1-3, as the user goes through the steps or instructs the steps for test and/or repair of the vehicle 12, trips to the tool box 130 located remotely from the vehicle 12 can be reduced if the list of requirements is generated. The user may need a DVOM (digital volt ohm meter), screwdriver, and test leads. The smart list of the tools or other resources reduces the back and forth needed, thus making the diagnosis more efficient. Additionally, the user is able to plan ahead and thereby reduce the possibility of losing prolonged time in the repair. The user, a day ahead of the test can generate and locate if a certain part is available in the storage warehouse. Further, if additional technicians are needed, then the availability of such technicians can be generated or scheduled ahead of time.

Therefore, the requirements list accommodates a user to schedule the resources that are needed to make the necessary diagnosis and/or repair. The advanced scheduling also allows the diagnosis or repairs to be executed in a more efficient manner and the information can be relayed to the owner of the vehicle, thus providing additional service support for the owner of the vehicle or third party.

As mentioned above, there can also be other resources, such as service manual, wiring manuals, additional help, etc. There can even be at a point of conclusion, a generation of a part number for the failed component, and then go to the parts needed. Separate fields can be included in the database. Therefore, the requirements list provides the ingredients list for a recipe. Any type of resources and at any level of the list of resources can be generated.

Figure 4:
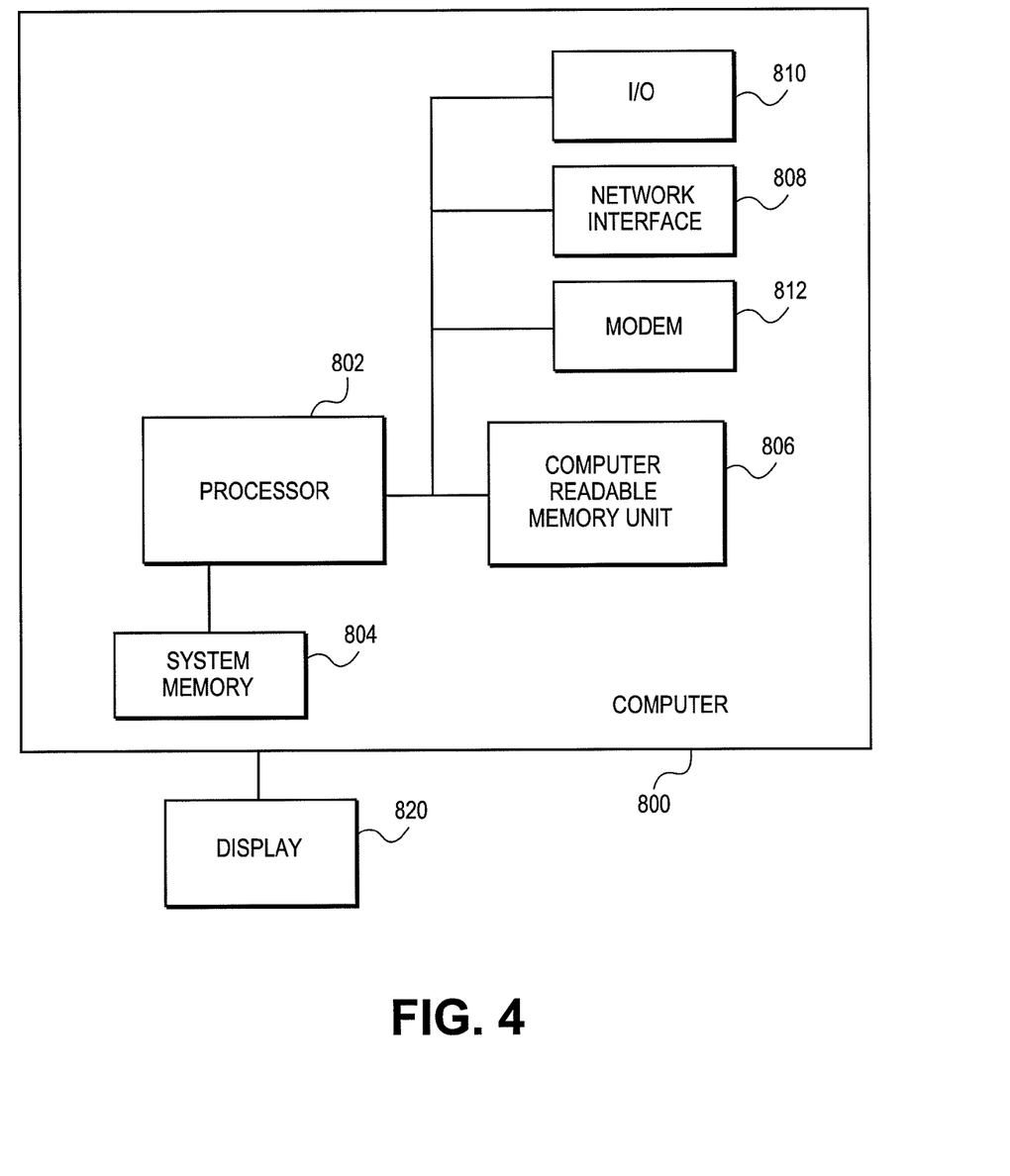
FIG. 4 is a block diagram of the computer of FIG. 1.

Referring to FIG. 4, an example of the computer 800 of FIG. 1, but not limited to this example of the computer 800, that can read computer readable media that includes computer-executable instructions of the disclosure. The computer 800 includes a processor 802 that uses the system memory 804 and a computer readable memory device 806 that includes certain computer readable recording media. A system bus connects the processor 802 to a network interface 808, modem 812 or other interface that accommodates a connection to another computer or network such as the Internet. The system bus may also include an input and output (I/O) interface 810 that accommodate connection to a variety of other devices. Furthermore, the computer 800 can output through, for example, the I/O 810, data for display on a display device 820.

The disclosure or parts thereof can be realized as computer-executable instructions in computer-readable media. The computer-readable media includes all possible kinds of media in which computer-readable data is stored or included or can include any type of data that can be read by a computer or a processing unit. The computer-readable media include for example and not limited to storing media, such as magnetic storing media (e.g., ROMs, floppy disks, hard disk, and the like), optical reading media (e.g., CD-ROMs (compact disc-read-only memory), DVDs (digital versatile discs), re-writable versions of the optical discs, and the like), hybrid magnetic optical disks, organic disks, system memory (read-only memory, random access memory), non-volatile memory such as flash memory or any other volatile or non-volatile memory, other semiconductor media, electronic media, electromagnetic media, infrared, and other communication media such as carrier waves (e.g., transmission via the Internet or another computer). Communication media generally embodies computer-readable instructions, data structures, program modules or other data in a modulated signal such as the carrier waves or other transportable mechanism including any information delivery media. Computer-readable media such as communication media may include wireless media such as radio frequency, infrared microwaves, and wired media such as a wired network. Also, the computer-readable media can store and execute computer-readable codes that are distributed in computers connected via a network. The computer readable medium also includes cooperating or interconnected computer readable media that are in the processing system or are distributed among multiple processing systems that may be local or remote to the processing system. The present disclosure can include the computer-readable medium having stored thereon a data structure including a plurality of fields containing data representing the techniques of the disclosure.

Figure 5:
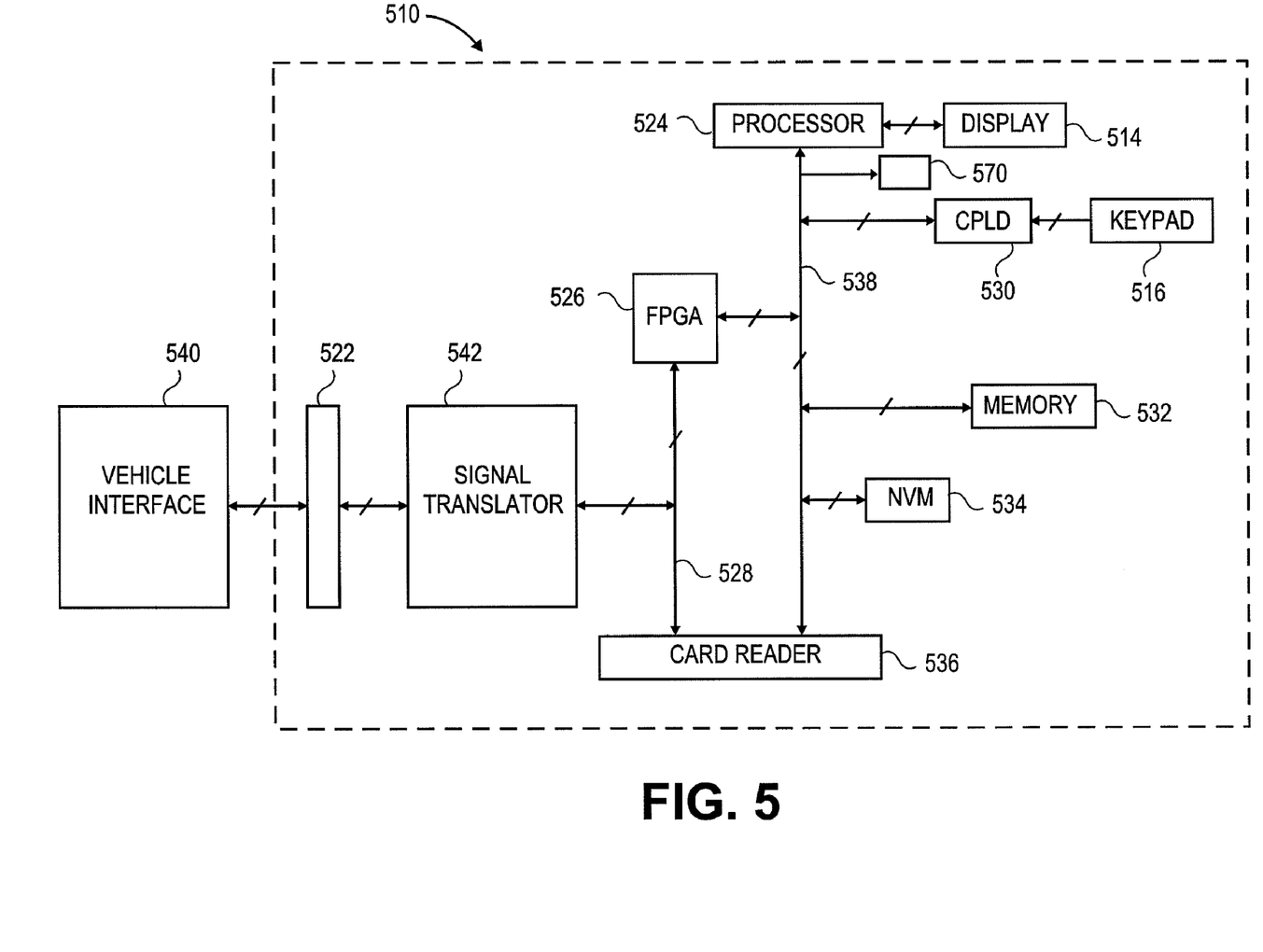
FIG. 5 is a block diagram of the components of the diagnostic tool of FIG. 1.

FIG. 5, shows the details of the diagnostic tool 510 of FIG. 1. The diagnostic tool can utilize the DTC's from the onboard computer, and/or check for the vehicle health information. FIG. 5 is a block diagram of the components of a diagnostic tool 510. The diagnostic tool 510, according to an embodiment of the disclosure, includes a processor 524, a field programmable gate array (FPGA) 526, a first system bus 528, the display 514, a complex programmable logic device (CPLD) 530, the user interface 516 in the form of a keypad, a memory subsystem 532, an internal non-volatile memory (NVM) 534, a card reader 536, a second system bus 538, the connector interface 522, and a selectable signal translator 542. A vehicle communication interface 540 is in communication with the diagnostic tool 510 through connector interface 522 via an external cable. The connection between the vehicle communication interface 540 and the connector interface 522 can also be a wireless connection such as BLUETOOTH, infrared device, wireless fidelity (WiFi, e.g. 802.11), etc.

The selectable signal translator 542 communicates with the vehicle communication interface 540 through the connector interface 522. The signal translator 542 conditions signals received from a motor vehicle control unit through the vehicle communication interface 540 to a conditioned signal compatible with the diagnostic tool 510. The translator 542 can communicate with, for example, the communication protocols of J1850 signal, ISO 9141-2 signal, communication collision detection (CCD) (e.g., Chrysler collision detection), data communication links (DCL), serial communication interface (SCI), S/F codes, a solenoid drive, J1708, RS232, controller area network (CAN), or other communication protocols that are implemented in a vehicle.

The circuitry to translate a particular communication protocol can be selected by the FPGA 526 (e.g., by tri-stating unused transceivers) or by providing a keying device that plugs into the connector interface 522 that is provided by diagnostic tool 510 to connect diagnostic tool 510 to vehicle communication interface 540. Translator 542 is also coupled to FPGA 526 and the card reader 536 via the first system bus 528. FPGA 526 transmits to and receives signals (i.e., messages) from the motor vehicle control unit through the translator 542.

FPGA 526 is coupled to the processor 524 through various address, data and control lines by the second system bus 538. FPGA 526 is also coupled to the card reader 536 through the first system bus 528. Processor 524 is also coupled to the display 514 in order to output the desired information to the user. The processor 524 communicates with the CPLD 530 through the second system bus 538. Additionally, the processor 524 is programmed to receive input from the user through the user interface 516 via the CPLD 530. The CPLD 530 provides logic for decoding various inputs from the user of diagnostic tool 510 and also provides the glue-logic for various other interfacing tasks.

Memory subsystem 532 and internal non-volatile memory 534 are coupled to the second system bus 538, which allows for communication with the processor 524 and FPGA 526. Memory subsystem 532 can include an application dependent amount of dynamic random access memory (DRAM), a hard drive, and/or read only memory (ROM). Software to run the diagnostic tool 510 can be stored in the memory subsystem 532. The internal non-volatile memory 534 can be, but not limited to, an electrically erasable programmable read-only memory (EEPROM), flash ROM, or other similar memory. The internal non-volatile memory 534 can provide, for example, storage for boot code, self-diagnostics, various drivers and space for FPGA images, if desired. If less than all of the modules are implemented in FPGA 526, the non-volatile memory 534 can contain downloadable images so that FPGA 526 can be reconfigured for a different group of communication protocols.

Figure 6:
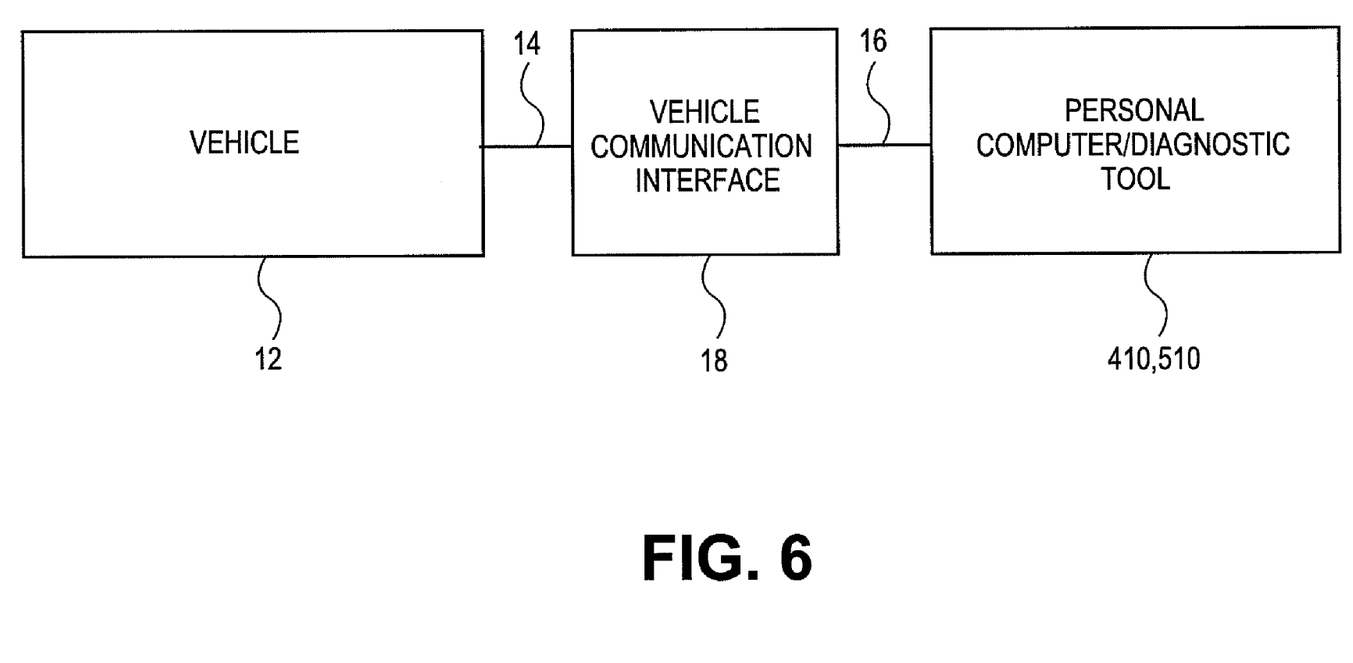
FIG. 6 is a view illustrating a connection between a vehicle and a diagnostic tool or personal computer of FIG. 1.

Referring to FIG. 6, the vehicle 12 is shown connected to a personal computer 800 or a dedicated diagnostic tool 510 via a vehicle communication interface 18. The first connection 14 between vehicle 12 and the vehicle communication interface 18, and the second connection 16 between the vehicle communication interface 18 and the personal computer/diagnostic tool 410 and 510 can be either wired or wireless.

Applicable communications with the host, such as the vehicle 12 connected to the unit, can be maintained during all functions of the vehicle during diagnostics. The connections 14 and 16 can include a wired connection such as through a RS232 port, USB (Universal Serial Bus), Ethernet cable. However, the connections 410 and 510 can also be wireless using protocols such as BLUETOOTH, IEEE 802.11x, wireless USB, other types of wireless Ethernet protocols, etc.

The list displayed on the diagnostic tool 510 or personal computer 800 can be outputted with or without the connection to the vehicle. The vehicle specific information can be inputted manually or automatically through a wired or wireless connection. The list can also be produced without the vehicle specific information. General information can be entered of the vehicle, or no information at all about the vehicle. Any level of the list can be generated. A general requirements list can be generated for all types of vehicle, or a list for a specific type of vehicle.

Although examples of the diagnostic system providing test requirement to support the diagnostic tests, other examples can also be made. For example, other information can be provided in advance of the diagnostic tests. The advanced information can used to support the diagnostic test, or the advance notice of the information can aid in the preparation for the test.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A diagnostic system for a vehicle, comprising:
   a remote database including diagnostic test requirements;
   a memory separate from the remote database, wherein the memory receives and stores vehicle specific information, and stores diagnostic test requirements for each sequential step of a plurality of diagnostic sequences received from the remote database; and
   a processor connected to the memory and identifies a list of diagnostic test requirements for a selected diagnostic sequence according to the vehicle specific information in advance of executing the selected diagnostic sequence.

2. The diagnostic system of claim 1, wherein the processor permits a repair facility to schedule certain testing and repairs based on an availability of the test requirements.

3. The diagnostic system of claim 1, further comprising a repair facility to allocate an inventory and environment for the selected diagnostic sequences in advance of diagnostic tests and repairs associated with the selected diagnostic sequences.

4. The diagnostic system of claim 1, further comprising a display device connected to the processor to display the diagnostic test requirements for certification of aptitude levels with regard to the diagnostic sequences.

5. The diagnostic system of claim 1, wherein the diagnostic test requirements being associated with a diagnostic or repair step in the diagnostic sequence.

6. The diagnostic system of claim 1, wherein the diagnostic test requirements include tools, parts, facilities and training.

7. The diagnostic system of claim 1, wherein the diagnostic test requirements includes a cost of a diagnostic test or location of the diagnostic test.

8. The diagnostic system of claim 1, further comprising a display device displaying the diagnostic test requirements, the diagnostic test requirements being a list of items that are required to perform a given diagnostic or repair procedure of the selected diagnostic sequence, the diagnostic test requirements being generated for any set of diagnostic sequences.

9. A method for a vehicle diagnostics, comprising:
   storing a sequence of test or repair procedures in a database of a diagnostic tool;
   correlating, with a processor of the diagnostic tool, the sequence of test or repair procedures with a list of test requirements for each sequential step of the sequence of test or repair procedures;
   receiving vehicle specific information from an input device of the diagnostic tool;
   identifying, with the processor, the list of test requirements according to the vehicle specific information and the correlated sequence of test or repair procedures; and
   performing a diagnostic test or repair on the vehicle according to the vehicle specific information and the identified list of test requirements.

10. The method of claim 9, further comprising permitting a repair facility, via the processor, to schedule certain testing and repairs based on an availability of the test requirements.

11. The method of claim 9, further comprising allocating at a repair facility, an inventory and environment for performing the diagnostic sequence in advance of diagnostic tests and repairs.

12. The method of claim 9, further comprising displaying the test requirements for certification of aptitude levels with regard to the diagnostic sequence.

13. The method of claim 9, wherein the list of test requirements being associated with a diagnostic or repair step in the sequence of test or repair procedures.

14. The method of claim 9, wherein the list of test requirements includes tools, parts, facilities and training.

15. The method of claim 9, wherein the list of test requirements includes a cost of the test requirement.

16. The method of claim 9, wherein the list of test requirements further comprising a list of items that are required to perform a given diagnostic or repair procedure.

17. A vehicle diagnostics system, comprising:
   means for storing a sequence of test or repair procedures in a database;
   means for correlating the sequence of test or repair procedures with a list of test requirements for each sequential step of the sequence of test or repair procedures;
   means for receiving vehicle specific information;
   means for identifying a list of test requirements according to the vehicle specific information, and the correlated sequence of test or repair procedures; and
   means for performing a diagnostic test or repair on the vehicle according to the vehicle specific information and the identified list of test requirements.

18. The diagnostic system of claim 17, further comprising means for permitting a facility to schedule certain testing and repairs based on an availability of the test requirements.

19. The diagnostic system of claim 17, further comprising a repair facility to allocate an inventory and environment for performing the diagnostic tests in advance of diagnostic tests or repairs.

20. The diagnostic system of claim 17, further comprising means for displaying connected to means for processing to display the list of test requirements for certification of aptitude levels with regard to the diagnostic tests.

21. The diagnostic system of claim 17, wherein the test requirements being associated with the diagnostic or repair step in the sequence of test or repair procedures.

22. The diagnostic system of claim 17, wherein the test requirements include tools, parts, facilities and training.

23. The diagnostic system of claim 17, wherein the test requirements include a cost of the test requirement.

24. The diagnostic system of claim 17, further comprising means for displaying a list of items that are required to perform a given diagnostic or repair procedure.

* * * * *